(12) United States Patent
Dutt et al.

(10) Patent No.: US 8,131,857 B2
(45) Date of Patent: Mar. 6, 2012

(54) FIBRE CHANNEL INTELLIGENT TARGET MANAGEMENT SYSTEM

(75) Inventors: Dinesh G. Dutt, Sunnyvale, CA (US); Sanjaya Kumar, Fremont, CA (US); Arindam Paul, Sunnyvale, CA (US); Samar Sharma, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 1236 days.

(21) Appl. No.: 11/827,474

(22) Filed: Jul. 11, 2007

(65) Prior Publication Data

US 2009/0019142 A1 Jan. 15, 2009

(51) Int. Cl.
G06F 15/173 (2006.01)
G06F 15/16 (2006.01)
(52) U.S. Cl. ......................... 709/227; 709/224; 709/225
(58) Field of Classification Search .......... 711/111–114; 709/203, 223–226
See application file for complete search history.

(56) References Cited

U.S. PATENT DOCUMENTS

| | | | |
|---|---|---|---|
| 6,421,723 B1 | 7/2002 | Tawil | |
| 6,996,691 B2 * | 2/2006 | Sicola et al. | 711/162 |
| 7,500,134 B2 * | 3/2009 | Madnani et al. | 714/4 |
| 7,558,981 B2 * | 7/2009 | Ashmore et al. | 714/6.1 |
| 7,606,239 B2 * | 10/2009 | Maveli et al. | 370/398 |
| 2003/0131182 A1 | 7/2003 | Kumar et al. | |
| 2003/0191857 A1 * | 10/2003 | Terrell et al. | 709/244 |
| 2003/0200399 A1 | 10/2003 | Dawkins et al. | |
| 2004/0024961 A1 * | 2/2004 | Cochran et al. | 711/112 |
| 2005/0111378 A1 * | 5/2005 | Chen et al. | 370/252 |
| 2006/0034284 A1 * | 2/2006 | Saklecha et al. | 370/392 |
| 2006/0271753 A1 * | 11/2006 | Kamano et al. | 711/163 |
| 2008/0072000 A1 * | 3/2008 | Osaki et al. | 711/162 |

OTHER PUBLICATIONS

Monia et al., RFC 4172 iFCP, "A Protocol for Internet Fibre Channel Storage Networking" http://www3.tools.ietf.org/html/rfc4172, printed on Jul. 11, 2007 pp. 1-110.
International Search Report and Written Opinion dated Oct. 9, 2008 from related PCT Application No. PCT/US08/69731, 7 pgs. (F-951222C-PC; Scientific-Atlanta, Inc.).

* cited by examiner

Primary Examiner — Joshua Joo
(74) Attorney, Agent, or Firm — Weaver Austin; Villeneuve & Sampson LLP (57) ABSTRACT

In one embodiment, a network device receives a port login directed to a target from a first host. The network device determines whether at least one other host is currently logged in to the target. The network device may then send a port login to the target corresponding to whether at least one other host is currently logged in to the target.

18 Claims, 8 Drawing Sheets

| Host ID 502 | | |
|---|---|---|
| Host 1 | | |
| Host 2 | | |
| Host 3 | | |

Number of hosts logged in: 3 504

| Host ID 502 | | LUN 512 | LUN Capacity 514 |
|---|---|---|---|
| Host 1 | | 1 | 200 |
| Host 2 | | 2 | 500 |
| Host 3 | | | |

Tuple 516:
  1) Target Login Key 518
     a) VSAN No. 522
     b) PWWN 524

2) Target Login Value 520
     a) NWWN 526
     b) Number of hosts logged in: 3 528
       c) Maximum number of hosts supported 530
     d) State variable 532

FIG. 7 though possibly not to the hosts. Thus, the host may send requests for logical units to what the host understands to be a physical storage device, e.g., a storage device identified in the request (e.g., read or write request) by a particular logical unit number (LUN) and a port identifier (e.g., World Wide Name or Port ID) of a port of the physical storage device.

FIBRE CHANNEL INTELLIGENT TARGET MANAGEMENT SYSTEM

BACKGROUND

1. Technical Field

The present disclosure relates generally to methods and apparatus for increasing the number of initiators that can login to a target.

2. Description of the Related Art

A host initiating a command such as a read or write command to a storage device in a network such as a Fibre Channel network may be referred to as an initiator. Similarly, a storage device receiving such a command in a network such as a Fibre Channel network may be referred to as a target.

Many targets allow only a limited number of initiators to login to a target port. As a result, the number of hosts that can be supported is limited.

DESCRIPTION OF EXAMPLE EMBODIMENTS

In the following description, numerous specific details are set forth in order to provide a thorough understanding of the disclosed embodiments. It will be obvious, however, to one skilled in the art, that the disclosed embodiments may be practiced without some or all of these specific details. In other instances, well known process steps have not been described in detail in order not to unnecessarily obscure the disclosed embodiments.

Overview

In one embodiment, a network device receives a port login directed to a target from a first host. The network device determines whether at least one other host is currently logged in to the target. The network device may then send a port login to the target corresponding to whether at least one other host is currently logged in to the target.

Specific Example Embodiments

In accordance with various embodiments of the invention, a network device such as a router may receive a Fibre Channel port login from a host. The network device may then determine whether at least one other host has already logged in to the target (and is still logged in to the target). If the network device determines that at least one other host is currently logged in to the target, the network device need not send a port login to the target. Rather, the network device may simply send a port login accept to the host. As a result, traffic sent to the target may be substantially reduced. Moreover, the target does not have the opportunity to reject the port login. Accordingly, the disclosed embodiments enable a greater number of hosts to log in to a target.

Figure 1:
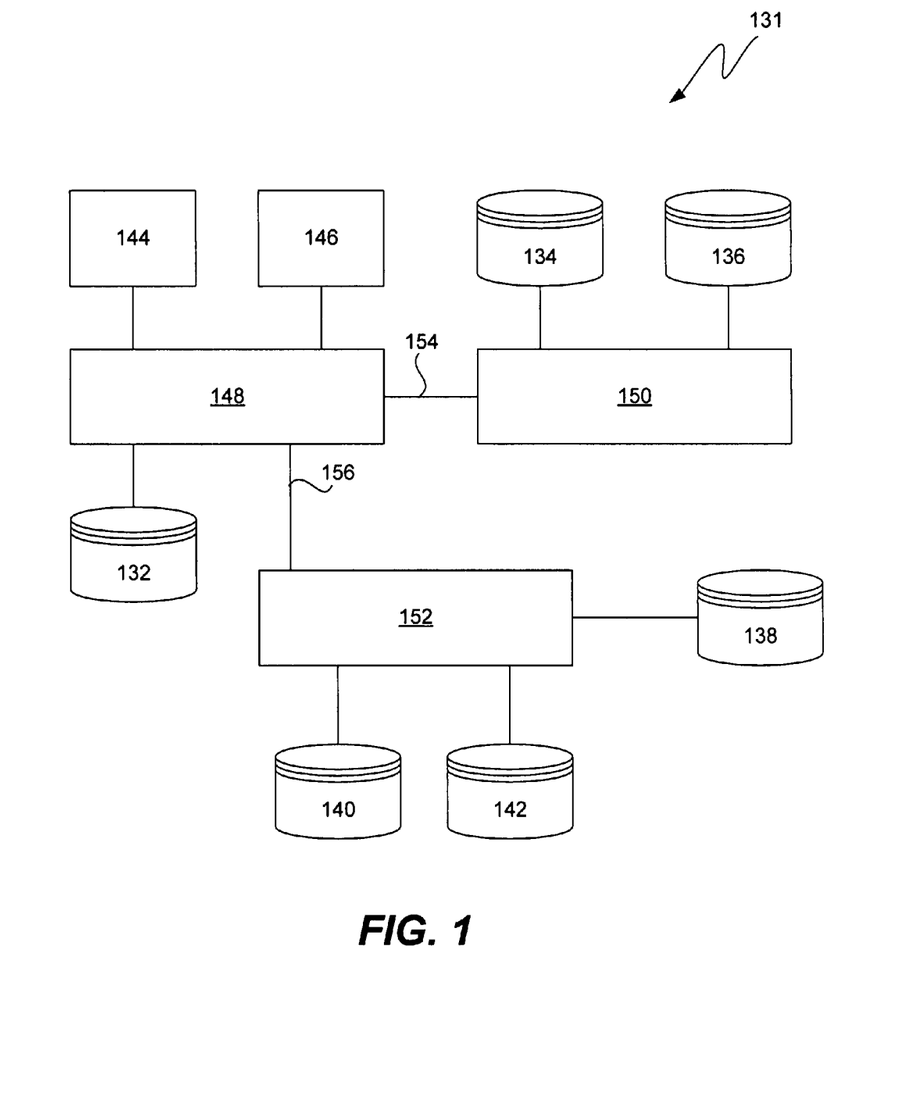
FIG. 1 is a diagram illustrating an example system.

FIG. 1 is a diagram illustrating an example system. Within a storage area network 131 such as that illustrated in FIG. 1, various storage devices 132, 134, 136, 138, 140, and 142 may be implemented, which may be homogeneous (e.g., identical device types, sizes, or configurations) as well as heterogeneous (e.g., different device types, sizes or configurations). Data may be read from, as well as written to, various portions of the storage devices 132-142 in response to commands sent by hosts 144 and 146. Communication among the storage devices and hosts may be accomplished by coupling the storage devices and hosts together via one or more switches, routers, or other network nodes configured to perform a switching function. In this example, switches 148, 150, and 152 communicate with one another via interswitch links 154 and 156.

Virtualization may be implemented on the switches or other "interior" network nodes of a storage area network. More particularly, one or more switches making up a network fabric may together implement the virtualization model of a given storage area network. Further, the virtualization may be implemented on a per port basis. In other words, a multi-port switch may have virtualization separately implemented on one or more of its ports. Individual ports may have dedicated logic for handing the virtualization functions for packets or frames handled by the individual ports. This may allow virtualization processing to scale with the number of ports.

In one embodiment, the virtualization logic may be separately implemented at individual ports of a given switch—rather than having centralized processing for all ports of a switch. This may allow the virtualization processing capacity to be closely matched with the exact needs of the switch on a per port basis. If a central processor is employed for the entire switch (serving numerous ports), the processor may be designed/selected to handle maximum traffic at all ports. For many applications, this represents extremely high processing requirements and a very large/expensive processor. If the central processor is too small, the switch may at times be unable to keep up with the switching/virtualization demands of the network. Thus, in one embodiment, a separate processor may be implemented on a per-port basis, enabling virtualization to be implemented on a per-port basis.

Virtualization may take many forms. In general, it may be defined as logic or procedures that inter-relate physical storage and virtual storage on a storage network. Hosts may see a representation of available physical storage that is not constrained by the physical arrangements or allocations inherent in that storage. One example of a physical constraint that is transcended by virtualization includes the size and location of constituent physical storage blocks. For example, logical units as defined by the Small Computer System Interface (SCSI) standards may come in precise physical sizes (e.g., 36 GB and 72 GB). Virtualization can represent storage in virtual logical units that are smaller or larger than the defined size of a physical logical unit. Further, virtualization can present a virtual logical unit comprised of regions from two or more different physical logical units, sometimes provided on devices from different vendors. The virtualization operations may be transparent to at least some network entities (e.g., hosts). In some general ways, virtualization on a storage area network is similar to virtual memory on a typical computer system. Virtualization on a network, however, brings far greater complexity and far greater flexibility. The complexity arises directly from the fact that there are a number of separately interconnected network nodes. Virtualization may span some or all of these nodes. The nodes may include hosts, storage subsystems, and switches (or comparable network traffic control devices such as routers). Often the hosts and/or storage subsystems are heterogeneous, being provided by different vendors. The vendors may employ distinctly different protocols (standard protocols or proprietary protocols). Thus, in many cases, virtualization provides the ability to connect heterogeneous initiators (e.g., hosts or servers) to a distributed, heterogeneous set of targets (storage subsystems), enabling the dynamic and transparent allocation of storage.

Figure 2:
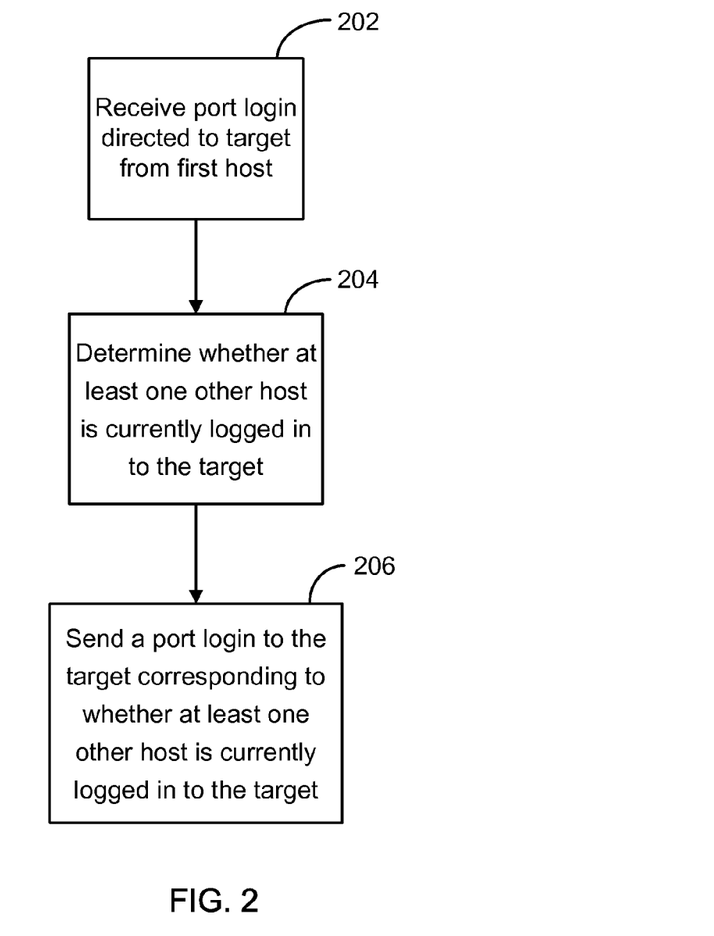
FIG. 2 is a process flow diagram illustrating an example method of managing Fibre Channel targets.

FIG. 2 is a process flow diagram illustrating an example method of managing Fibre Channel targets. As shown at 202, a network device may receive a process login directed to a target from a first host. The network device may determine whether at least one other host is currently logged in to the target 204. For instance, the network device may determine whether another port login directed to the target was previously received from a second host. The network device may then send a port login to the target corresponding to whether at least one other host is currently logged in to the target 206.

Figure 3:
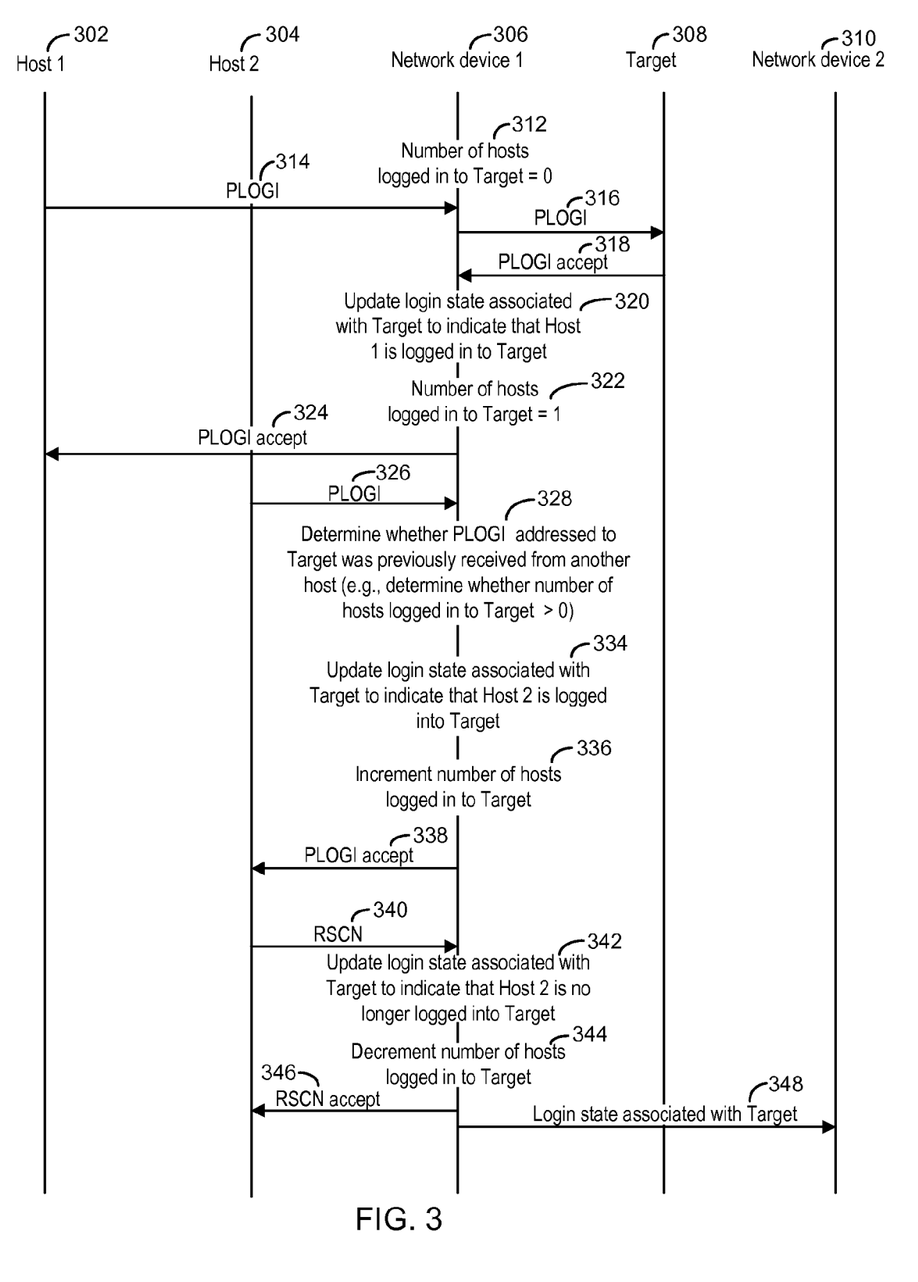
FIG. 3 is a transaction flow diagram illustrating an example method of managing Fibre Channel targets when there is no virtualization application running.

FIG. 3 is a transaction flow diagram illustrating an example method of managing Fibre Channel targets. Steps performed by a first host, Host 1 302, a second host, Host 2 304, a first network device, Network device 1 306, a Target 308, and a second network device, Network device 2 310, are represented by corresponding vertical lines. In this example, the target is a physical target (rather than a virtual target). For example, the target may be a JBOD, disk array, or other storage media. Network device 1 306 may perform initialization by initializing the number of hosts logged into a target at 312. More particularly, when a target such as Target 308 is brought up or rebooted, Network device 1 306 may initialize the number of hosts logged into the target to zero.

When Host 1 302 sends a port login (PLOGI) to Network device 1 306 at 314, Network device 1 306 may determine whether at least one host is already logged in to Target 308 (e.g., whether another PLOGI directed to the target was previously received from another host). More particularly, Network device 1 306 may ascertain the number of hosts logged in to Target 308. Since the number of hosts logged in to Target 308 is zero, Network device 1 306 may send a PLOGI to Target 308 at 316. Target 308 may then send a PLOGI accept to Network device 1 306 at 318.

Upon successfully logging Host 1 302 into Target 308, Network device 1 306 may update login state information associated with Target 308. For instance, Network device 1 306 may update the login state associated with the target to indicate that Host 1 302 is logged into the target at 320. In other words, Network device 1 306 may store a Fibre Channel Identifier (FCID) associated with the host in association with the target. In addition, Network device 1 306 may increment the number of hosts logged into the target at 322. In this example, the number of hosts logged into the target is equal to 1. In order to update the login state associated with the target, Network device 1 306 may update a data structure associated with the target. For instance, Network device 306 may store a login state associated with the target indicating a number of hosts logged in to the target and/or a FCID associated with host(s) logged in to the target. An example of such a data structure will be described in further detail below with reference to FIG. 5.

Since Network device 1 306 has received a PLOGI accept from Target 308, Network device 1 306 sends a PLOGI accept to Host 1 302 at 324. Since Host 1 302 is now aware that is successfully logged in to Target 308, Host 1 302 may now send Small Computer System Interface (SCSI) commands such as SCSI Read and SCSI Write commands to Target 308. Network device 1 306 may therefore update information associated with SCSI exchanges and corresponding Read and Write commands in the data structure associated with Target 308. For instance, Network device 1 306 may update a status of Read and Write commands, as well as the pertinent address(es) associated with the Read/Write commands.

A second host, Host 2 304, may subsequently attempt to log in to the same target, Target 308, by sending a PLOGI at 326 to Network device 1 306. Network device 1 306 may determine whether at least one host is already logged in to Target 308 at 328. More particularly, Network device 1 306 may ascertain the number of hosts logged in to Target 308. Since the number of hosts logged in to Target 308 is greater than zero, Network device 306 does not send a PLOGI to Target 308. Rather, Network device 1 306 may update the login state associated with the target to indicate that Host 2 304 has successfully logged in to the target at 334, even though Host 2 304 has not been logged in to the target by sending a PLOGI to the target. In addition, Network device 1 306 may increment the number of hosts logged in to the target at 336. Thus, Host 2 304 is treated as if it has logged into Target 308, even though it has not technically logged into Target 308. Network device 1 306 may also send a PLOGI accept to Host 2 304 at 338 (without sending a PLOGI to the target or receiving a PLOGI accept from the target). More particularly, Network device 1 306 may modify a Fibre Channel Identifier (FCID) of a process login accept previously sent to the second host prior to sending the port login accept to the first host.

It is also important to note that when a host such as Host 2 304 sends a Registered State Change Notification (RSCN) at 340 to logout of the target, the RSCN need not be sent to Target 308. In addition, the login state may also be updated accordingly. For instance, the login state associated with the target may be updated to indicate that Host 2 304 is no longer logged in to the target at 342 (e.g., by removing the FCID associated with Host 2 304 from the login state or associated data structure). Similarly, the number of hosts logged in to the target may be decremented at 344, even though Host 2 304 has not been logged out of the target by sending a RSCN to the target. Network device 1 306 may send a RSCN accept to Host 2 304 at 346 to confirm that Host 2 304 has been logged out of the target.

Network device 1 306 may also send the login state associated with the target to another network device, Network device 2 310, as shown at 348. More particularly, a data structure storing the login state associated with the target may be transmitted to Network device 2 310. Thereafter, Network device 2 310 may implement the disclosed embodiments using the information that it has received from Network device 1 306. More particularly, when Network device 2 310 receives a PLOGI addressed to Target 308 from a host, Network device 2 310 need not send a PLOGI to Target 308 if the login state indicates that at least one host is logged in to Target 308, even if the host logged in to Target 308 via another network device, such as Network device 1 306. Rather, the login state may be updated as if the host is logged in to Target

308, even though the host is not actually logged in to Target 308. Moreover, Network device 2 310 may send a PLOGI accept to the host.

The disclosed embodiments may also be implemented in a system in which storage virtualization is supported. More particularly, in accordance with various embodiments, a host may send commands to a virtual target, rather than a physical target. Storage virtualization may be implemented via a virtualization application running on the host, the network device, and/or the virtual target. When storage virtualization is implemented by the network device, the virtualization may be implemented on a per-port basis. More particularly, virtualization may be supported by one or more ports of the network device. Moreover, virtualization may be supported by one or more processors of the network device.

Figure 4:
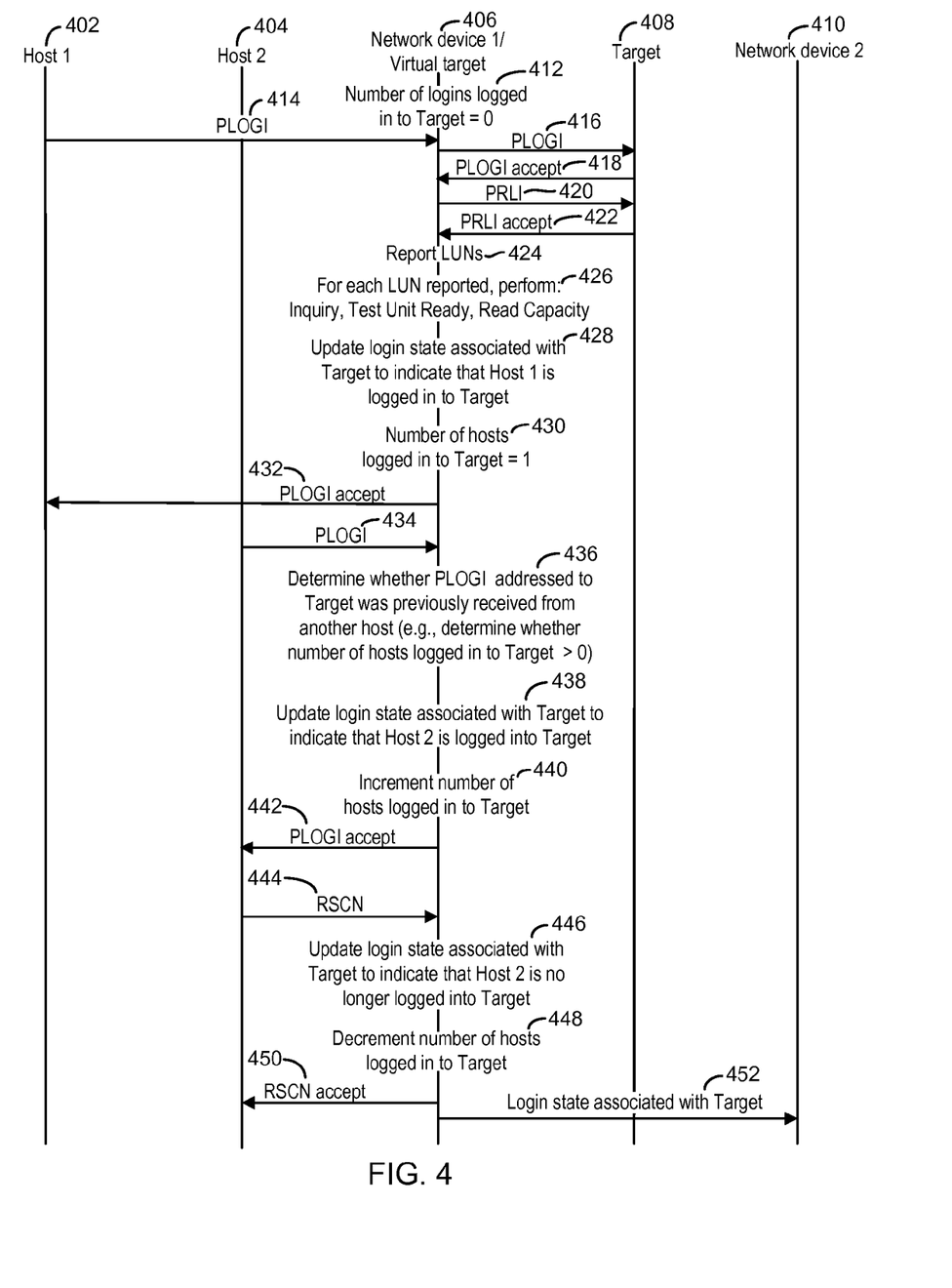
FIG. 4 is a transaction flow diagram illustrating an example method of managing Fibre Channel targets when there is a virtualization application running.

FIG. 4 is a transaction flow diagram illustrating an example method of managing Fibre Channel targets when there is a virtualization application running. Steps performed by a first host, Host 1 402, a second host, Host 2 404, a first network device, Network device 1 406, a Target 408, and a second network device, Network device 2 410, are represented by corresponding vertical lines.

In this example, the Network device 1 406 is a virtual target. In other words, the initiator (e.g., Host 1 or Host 2) is not aware of the actual, physical targets or associated physical addresses. Rather the initiator directs commands to a virtual address. The virtual target may then translate the virtual address to a corresponding set of physical addresses associated with one or more physical targets. In this example, the physical target is Target 408. Thus, the virtual target, Network device 1 406, may perform a virtual-physical mapping in order to enable an initiator to log in to the physical target, Target 408.

Network device 1 406 may perform initialization by initializing the number of hosts logged into a target at 412. More particularly, when a target such as Target 408 is brought up or rebooted, Network device 1 406 may initialize the number of hosts logged into the target to zero.

When Host 1 402 sends a PLOGI to a virtual target, Network device 1 406, at 414, Network device 1 406 may determine whether at least one host is already logged in to one or more physical targets corresponding to the virtual target, Network device 1 406. More particularly, Network device 1 406 may determine whether at least one host is already logged in to Target 408. More particularly, Network device 1 406 may ascertain the number of hosts logged in to Target 408. Since the number of hosts logged in to Target 408 is zero, Network device 1 406 may send a PLOGI to Target 408 at 416. Target 408 may then send a PLOGI accept to Network device 1 406 at 418.

In addition, upon receiving the PLOGI accept, Network device 1 406 may send a Process Login (PRLI) to Target 408 at 420. Target 408 may then send a PRLI accept to Network device 1 406 at 422.

Network device 1 406 may send a command Report Logical Units (LUNs) at 424, in order to identify each LUN that is pertinent to the virtual storage locations. For each LUN that is reported, Network device 1 406 may perform initialization steps such as Inquiry, Test Unit Ready, and Read Capacity at 426. Through such initialization steps, Network device 1 406 may ensure that the LUN is responding and has the capacity to read data from physical targets.

Upon successfully logging Host 1 402 into Target 408, Network device 1 406 may update login state information associated with Target 408. For instance, Network device 1 406 may update the login state associated with the target to indicate that Host 1 402 is logged into the target at 428. In addition, Network device 1 406 may increment the number of hosts logged into the target at 430. In this example, the number of hosts logged into the target is equal to 1. In order to update the login state associated with the target, Network device 1 406 may update a data structure associated with the target. An example of such a data structure will be described below with reference to FIG. 5.

Since Network device 1 406 has received a PLOGI accept from Target 408, Network device 1 406 sends a PLOGI accept to Host 1 402 at 432. Since Host 1 402 is now aware that is successfully logged in to Target 408, Host 1 402 may now send SCSI commands such as SCSI Read and SCSI Write commands to Target 408. Network device 1 406 may therefore update information associated with SCSI exchanges and corresponding Read and Write commands in the data structure associated with Target 408. For instance, Network device 1 406 may update a status of Read and Write commands, as well as the pertinent virtual and/or physical address(es) associated with the Read/Write commands.

A second host, Host 2 404, may subsequently attempt to log in to the same target, Target 408, by sending a PLOGI at 434 to Network device 1 406. Network device 1 406 may determine whether at least one host is already logged in to Target 408 at 436. More particularly, Network device 1 406 may ascertain the number of hosts logged in to Target 408. Since the number of hosts logged in to Target 408 is greater than zero, Network device 406 does not send a PLOGI to Target 408. Rather, Network device 1 406 may update the login state associated with the target to indicate that Host 2 404 has successfully logged in to the target at 438, even though Host 2 404 has not been logged in to the target by sending a PLOGI to the target. In addition, Network device 1 406 may increment the number of hosts logged in to the target at 440. Network device 1 406 may also send a PLOGI accept to Host 2 404 at 442 (without sending a PLOGI to the target or receiving a PLOGI accept from the target). It is also important to note that steps 424-426 need not be performed, since Host 2 404 need not be logged in to Target 408.

It is also important to note that when a host such as Host 2 404 sends a RSCN at 444 to logout of the target, the RSCN need not be sent to Target 408. In addition, the login state may also be updated accordingly. For instance, the login state associated with the target may be updated to indicate that Host 2 404 is no longer logged in to the target at 446 (e.g., by removing the association between a FCID of Host 2 404 and the target). Similarly, the number of hosts logged in to the target may be decremented at 448, even though Host 2 404 has not been logged out of the target by sending a RSCN to the target. Network device 1 406 may send a RSCN accept to Host 2 404 at 450 to confirm that Host 2 404 has been logged out of the target.

Network device 406 may also send the login state associated with the target to another network device, Network device 2 410, as shown at 452. More particularly, a data structure storing the login state associated with the target may be transmitted to Network device 2 410. Thereafter, Network device 2 410 may implement the disclosed embodiments using the information that it has received from Network device 1 406. More particularly, when Network device 2 410 receives a PLOGI addressed to the virtual target, Network device 1, 406, from a host, Network device 2 410 need not send a PLOGI to Target 408 if the login state indicates that at least one host is logged in to Target 408. Rather, the login state may be updated as if the host is logged in to Target 408, even though the host is not actually logged in to Target 408. Moreover, Network device 2 410 may send a PLOGI accept to the host. Since the host need not log in to the Target 408, the disclosed embodiments reduce the time that is taken to complete login and other associated processes (e.g., LUN discovery).

Figure 5A:
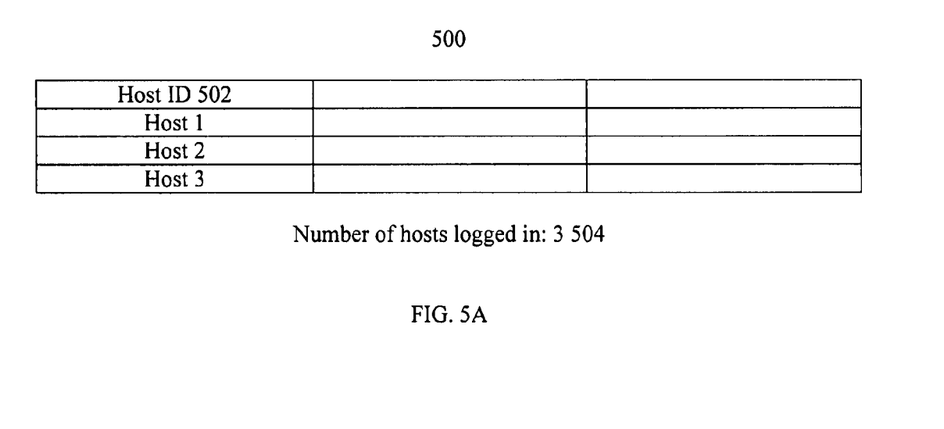
FIG. 5A is an example data structure that may be used to store login state information when there is no virtualization application running.

FIG. 5A is an example data structure 500 that may be used to store login state information associated with a target when there is no virtualization application running. The data structure 500 may identify each host logged in to the target. More particularly, each host logged in to the target may be identified by a host identifier (ID) 502 such as a FCID. In addition, the data structure 500 may indicate a number of hosts 504 logged in to the target.

Figure 5B:
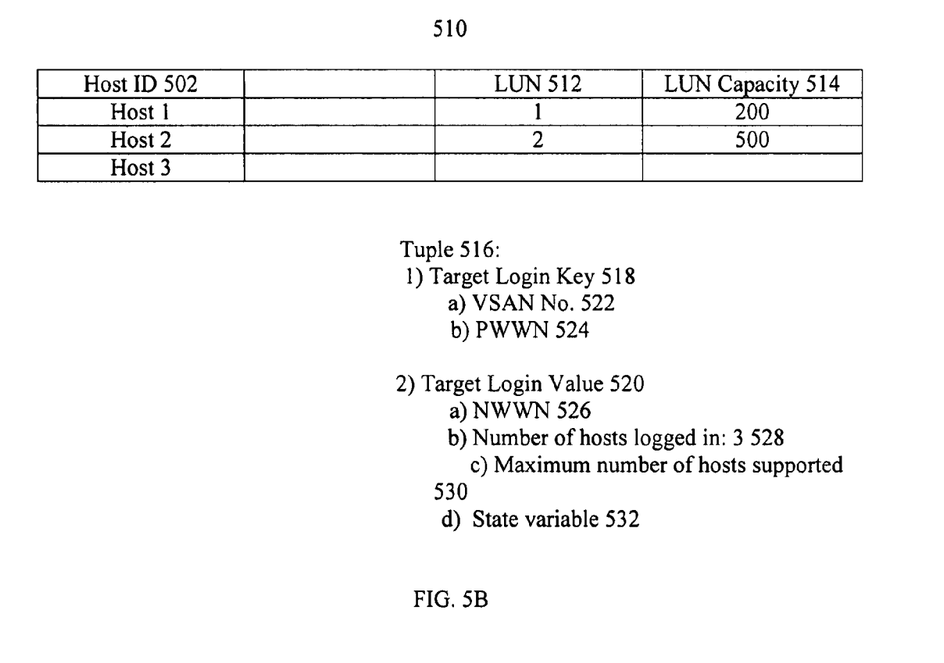
FIG. 5B is an example data structure that may be used to store login state information when there is a virtualization application running.

FIG. 5B is an example data structure 510 that may be used to store login state information when there is a virtualization application running. The data structure 510 may identify each host that is logged in to the target via a host identifier 502. In embodiments in which virtualization of storage is implemented, the data structure 510 may also store a LUN identifier 512 (e.g., number) and LUN capacity 514 for each LUN associated with the target (e.g., when a response to a Read Capacity command is received). In addition, the data structure 510 may include at least one tuple 516, where the tuple includes a Target Login Key 518 and a Target Login Value 520. Each Target Login Key 518 may include a Virtual Storage Area Network (VSAN) number 522 associated with the target and a Port World Wide Name (PWWN) 524 associated with the target. Each Target Login Value 520 may include a Node World Wide Name (NWWN) 526 associated with the target, a number of hosts currently logged in to the target 528, a maximum number of concurrent host logins that the target can support 530, and/or a state variable 532 depicting the state of the data structure 510. For example, the state may indicate whether the maximum number of concurrent host logins that the target can support has been met. Of course, it is also possible that some or all of this information may be stored in a different configuration, as well as multiple data structures.

A different data structure such as that shown in FIG. 5A or FIG. 5B may be associated with each target. More particularly, a data structure such as that shown in FIG. 5A or FIG. 5B may be created for each target during initialization. Alternatively, such a data structure may be created when a first host logs in to the target. In this manner, metadata representing a login state associated with the target may then be stored in the data structure.

Figure 6A:
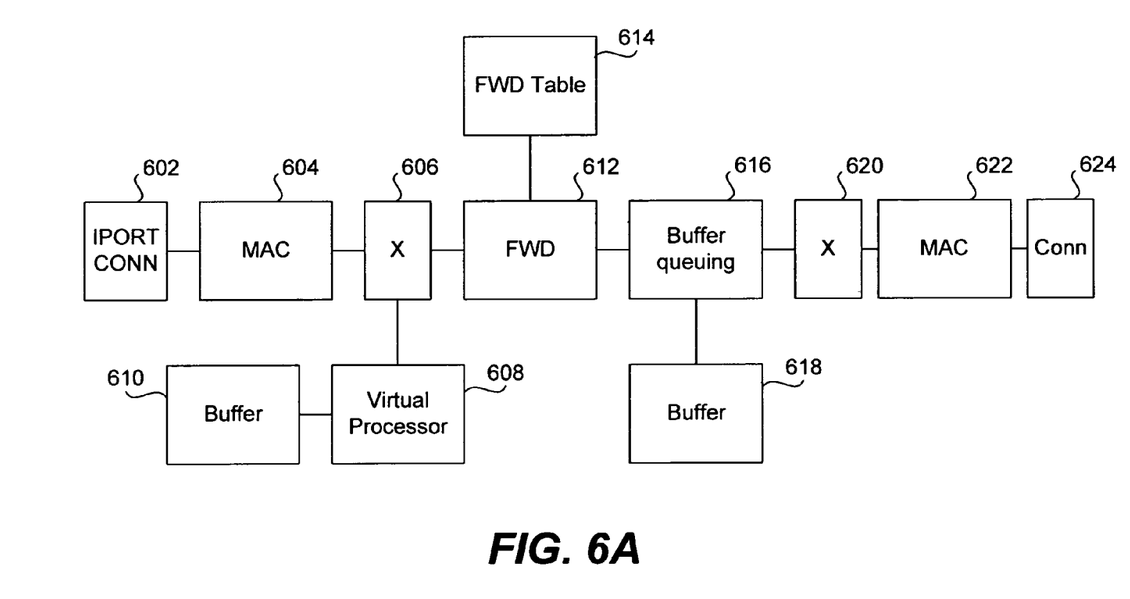
FIG. 6A is a block diagram illustrating an example virtualization switch.

A virtual target such as Network device 2 410 may be implemented as a switch, which may be referred to as a "virtualization switch." Various switches within a storage area network may be virtualization switches supporting virtualization functionality. FIG. 6A is a block diagram illustrating an example virtualization switch in which various embodiments may be implemented. As shown, data may be received by an intelligent, virtualization port via a bi-directional connector 602. In association with the incoming port, Media Access Control (MAC) block 604 may be provided, which enables frames of various protocols such as Ethernet or Fibre Channel to be received. In addition, a virtualization intercept switch 606 may determine whether an address specified in an incoming frame pertains to access of a virtual storage location of a virtual storage unit representing one or more physical storage locations on one or more physical storage units of the storage area network. In this example, the frame is received via a bi-directional connector 602 and the new or modified frame exits from the switch fabric 620. However, it is important to note that a virtualization switch may be implemented in an alternate manner. For instance, the frame may be received from the fabric 620, redirected by 606 to 608, virtualized and sent back to the switch fabric 620. This is important when a host and disk are connected to a standard line card such as that illustrated in FIG. 6B, and the host and disk share several virtualization cards such as that illustrated in FIG. 6A.

When the virtualization intercept switch 606 determines that the address specified in an incoming frame pertains to access of a virtual storage location rather than a physical storage location, the frame may be processed by a virtualization processor 608 capable of performing a mapping function such as that described above. More particularly, the virtualization processor 608 may obtain a virtual-physical mapping between the one or more physical storage locations and the virtual storage location. In this manner, the virtualization processor 608 may look up either a physical or virtual address, as appropriate. For instance, it may perform a mapping from a physical address to a virtual address or, alternatively, from a virtual address to one or more physical addresses.

Once the virtual-physical mapping is obtained, the virtualization processor 608 may then employ the obtained mapping to either generate a new frame or modify the existing frame, thereby enabling the frame to be sent to an initiator or a target specified by the virtual-physical mapping. For instance, a frame may be replicated multiple times in the case of a mirrored write. This replication may be specified by a virtual-physical mapping function. In addition, the source address and/or destination addresses may be modified as appropriate. For instance, for data from the target, the virtualization processor may replace the source address, which was originally the physical LUN address with the corresponding virtual LUN and virtual address.

In the destination address, the port may replace its own address with that of the initiator. For data from the initiator, the port may change the source address from the initiator's address to the port's own address. It may also change the destination address from the virtual LUN/address to the corresponding physical LUN/address. The new or modified frame may then be provided to the virtualization intercept switch 606 to enable the frame to be sent to its intended destination.

While the virtualization processor 608 obtains and applies the virtual-physical mapping, the virtualization switch may store the frame or associated data in a temporary memory location (e.g., buffer) 610. In addition, it may be desirable to store data that is being transmitted or received until it has been confirmed that the desired read or write operation has been successfully completed. As one example, it may be desirable to write a large amount of data to a virtual LUN, which is to be transmitted separately in multiple frames. It may therefore be desirable to temporarily buffer the data until confirmation of receipt of the data is received. As another example, it may be desirable to read a large amount of data from a virtual LUN, which may be received separately in multiple frames. Furthermore, this data may be received in an order that is inconsistent with the order in which the data should be transmitted to the initiator of the read command. In this instance, it may be beneficial to buffer the data prior to transmitting the data to the initiator to enable the data to be re-ordered prior to transmission. Similarly, it may be desirable to buffer the data in the event that it is becomes desirable to verify the integrity of the data that has been sent to an initiator (or target).

The new or modified frame may then be received by a forwarding engine 612, which obtains information from various fields of the frame, such as source address and destination address. The forwarding engine 612 may access a forwarding table 614 to determine whether the source address has access to the specified destination address. More specifically, the forwarding table 614 may include physical LUN addresses as well as virtual LUN addresses. The forwarding engine 612 may also determine the appropriate port of the switch via which to send the frame, and generate an appropriate routing tag for the frame.

Once the frame is appropriately formatted for transmission, the frame may be received by a buffer queuing block 616 prior to transmission. Rather than transmitting frames as they are received, it may be desirable to temporarily store the frame in a buffer or queue 618. For instance, it may be desirable to temporarily store a packet based upon Quality of Service in one of a set of queues that each correspond to different priority levels. The frame may then transmitted via switch fabric 620 to the appropriate port. As shown, the outgoing port may have its own MAC block 622 and bi-directional connector 624 via which the frame may be transmitted.

Figure 6B:
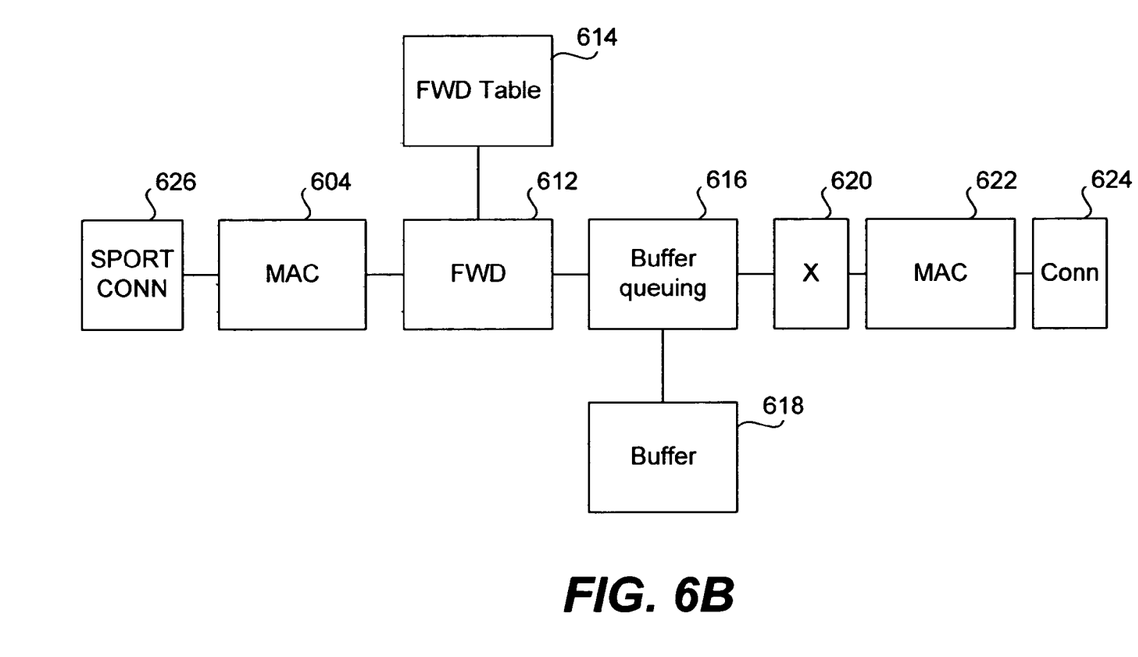
FIG. 6B is a block diagram illustrating an example standard switch.

As described above, all switches in a storage area network need not be virtualization switches. In other words, a switch may be a standard switch in which none of the ports implement "intelligent," virtualization functionality. FIG. 6B is a block diagram illustrating an example standard switch in which various embodiments may be implemented. As shown, a standard port 626 may have a MAC block 604. However, a virtualization intercept switch and virtualization processor such as those illustrated in FIG. 6A are not implemented. A frame that is received at the incoming port is merely processed by the forwarding engine 612 and its associated forwarding table 614. Prior to transmission, a frame may be queued 616 in a buffer or queue 618. Frames are then forwarded via switch fabric 620 to an outgoing port. As shown, the outgoing port may also have an associated MAC block 622 and bi-directional connector 624.

As described above, the disclosed embodiments may be implemented, at least in part, by a virtualization switch. Virtualization may be performed on a per-port basis rather than per switch. Thus, each virtualization switch may have one or more virtualization ports that are capable of performing virtualization functions, as well as ports that are not capable of such virtualization functions. In one embodiment, the switch is a hybrid, with a combination of line cards as described above with reference to FIG. 6A and FIG. 6B.

Although the network devices described above with reference to FIGS. 6A and 6B are described as switches, these network devices are merely illustrative. Thus, other network devices such as routers may be implemented to receive, process, modify and/or generate packets or frames with functionality such as that described above for transmission in a storage area network. Moreover, the above-described network devices are merely illustrative, and therefore other types of network devices may be implemented to perform the disclosed functionality. Generally, the techniques for performing the disclosed embodiments may be implemented on software and/or hardware. For example, they can be implemented in an operating system kernel, in a separate user process, in a library package bound into network applications, on a specially constructed machine, or on a network interface card. In a specific embodiment of this invention, the techniques of the present invention are implemented in software such as an operating system or in an application running on an operating system.

A software or software/hardware hybrid packet processing system of this invention may be implemented on a general-purpose programmable machine selectively activated or reconfigured by a computer program stored in memory. Such programmable machine may be a network device designed to handle network traffic. Such network devices typically have multiple network interfaces including frame relay and ISDN interfaces, for example. Specific examples of such network devices include routers and switches. For example, the packet processing systems of this invention may be specially configured routers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. Further, the invention may be at least partially implemented on a card (e.g., an interface card) for a network device or a general-purpose computing device.

In one embodiment, the network device implementing the disclosed embodiments is a router. The router may include one or more line cards. One or more of these line cards may support virtualization of storage. More particularly, one or more ports of these line cards may support virtualization of storage.

Figure 7:
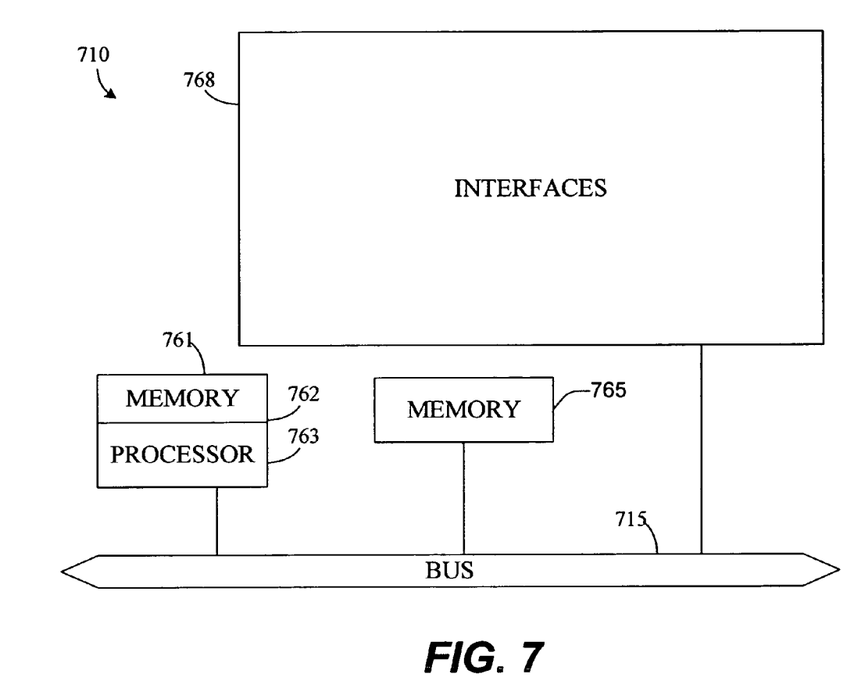
FIG. 7 is a diagrammatic representation of an example router in which various embodiments may be implemented.

Referring now to FIG. 7, a router 710 suitable for implementing embodiments of the invention includes a master central processing unit (CPU) 762, interfaces 768, and a bus 715 (e.g., a PCI bus). When acting under the control of appropriate software or firmware, the CPU 762 is responsible for such router tasks as routing table computations and network management. It may also be responsible for implementing the disclosed embodiments, in whole or in part. The router may accomplish these functions under the control of software including an operating system (e.g., the Internetwork Operating System (IOS®) of Cisco Systems, Inc.) and any appropriate applications software. CPU 62 may include one or more processors 763 such as a processor from the Motorola family of microprocessors or the MIPS family of microprocessors. In an alternative embodiment, processor 763 is specially designed hardware for controlling the operations of router 10. In a specific embodiment, a memory 761 (such as non-volatile RAM and/or ROM) also forms part of CPU 762. However, there are many different ways in which memory could be coupled to the system. Memory block 761 may be used for a variety of purposes such as, for example, caching and/or storing data, programming instructions, etc.

The interfaces 768 are typically provided as interface cards (sometimes referred to as "line cards"). Generally, they control the sending and receiving of data packets or data segments over the network and sometimes support other peripherals used with the router 710. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, LAN interfaces, WAN interfaces, metropolitan area network (MAN) interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 762 to efficiently perform routing computations, network diagnostics, security functions, etc.

Although the system shown in FIG. 7 is one specific router of the present invention, it is by no means the only router architecture on which the disclosed embodiments can be implemented. For example, an architecture having a single processor that handles communications as well as routing computations, etc. is often used. Further, other types of interfaces and media could also be used with the router.

Regardless of network device's configuration, it may employ one or more memories or memory modules (such as, for example, memory block 765) configured to store data, program instructions for the general-purpose network operations and/or the inventive techniques described herein. The program instructions may control the operation of an operating system and/or one or more applications, for example.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks and DVDs; magneto-optical media such as floptical disks; and hardware devices that are specially configured to store and perform program instructions, such as read-only memory devices (ROM) and random access memory (RAM). The disclosed embodiments may also be embodied in a carrier wave traveling over an appropriate medium such as optical lines, electric lines, etc. Examples of program instructions include both machine code, such as produced by a compiler, and files containing higher level code that may be executed by the computer using an interpreter.

Although illustrative embodiments and applications of the disclosed embodiments are shown and described herein, many variations and modifications are possible which remain within the concept, scope, and spirit of the embodiments of the invention, and these variations would become clear to those of ordinary skill in the art after perusal of this application. Moreover, the disclosed embodiments need not be performed using the steps described above. Accordingly, the present embodiments are to be considered as illustrative and not restrictive, and the disclosed embodiments are not to be limited to the details given herein, but may be modified within the scope and equivalents of the appended claims.

What is claimed is:

1. A method, comprising:
receiving a port login directed to a target from a first host;
determining whether at least one other host is currently logged in to the target;
sending a port login to the target corresponding to whether at least one other host is currently logged in to the target, wherein the target is a virtual target;
wherein determining whether at least one other host is currently logged in to the target includes determining whether at least one other host is currently logged in to one or more physical targets associated with the virtual target;
wherein sending a port login to the target corresponding to whether at least one other host is currently logged in to the target includes sending a port login to the one or more physical targets corresponding to whether at least one other host is currently logged in to the one or more physical targets;
storing a login state associated with the target, the login state indicating a number of hosts logged in to the target; and
sending the login state to another network device, wherein sending the login state to another network device includes sending a data structure including the login state associated with the target to another network device;
wherein the data structure further identifies each Logical Unit (LUN) associated with the target and a LUN capacity for each LUN associated with the target.

2. The method as recited in claim 1, wherein sending a port login to the target corresponding to whether at least one other host is currently logged in to the target comprises:
if it has been determined that at least one other host is not currently logged in to the target, sending the port login to the target and sending a port login accept to the first host.

3. The method as recited in claim 1, wherein sending a port login to the target corresponding to whether at least one other host is currently logged in to the target comprises:
if it has been determined that at least one other host is currently logged in to the target, sending a port login accept to the first host without sending a port login to the target.

4. The method as recited in claim 3, wherein sending a port login accept to the first host comprises:
modifying a destination Fibre Channel Identifier (FCID) from a FCID of a second host to a FCID of the first host prior to sending the port login accept to the first host.

5. The method as recited in claim 1, wherein the login state further identifies each host logged in to the target.

6. The method as recited in claim 1, wherein the login state further identifies each host logged in to the target.

7. The method as recited in claim 1, further comprising:
creating the data structure associated with the target; and
storing metadata representing the login state associated with the target in the data structure.

8. The method as recited in claim 1, wherein determining whether at least one other host is currently logged in to the target includes determining whether another port login directed to the target was previously received from a second host.

9. The method as recited in claim 8, wherein sending a port login to the target corresponding to whether another port login directed to the target was previously received comprises:
if it has been determined that another port login directed to the target was not previously received from a second host, sending the port login to the target and sending a port login accept to the first host.

10. The method as recited in claim 8, wherein sending a port login to the target corresponding to whether another port login directed to the target was previously received comprises:
if it has been determined that another port login directed to the target was previously received, sending a port login accept to the first host without sending a port login to the target.

11. The method as recited in claim 10, wherein sending a port login accept to the first host comprises:
modifying a destination Fibre Channel Identifier (FCID) of a port login accept previously transmitted to a second host to a FCID of the first host prior to sending the port login accept to the first host.

12. The method as recited in claim 1, further comprising:
incrementing a number of hosts logged in to the target when a port login (PLOGI) is received from the first host;
wherein a PLOGI is not sent to the target.

13. The method as recited in claim 1, further comprising:
incrementing a number of hosts logged in to the target, wherein the first host is not logged in to the target.

14. The method as recited in claim 1, further comprising:
decrementing a number of hosts logged in to the target when a registered state change notification is received from the host, wherein a registered state change notification is not sent to the target.

15. The method as recited in claim 1, further comprising:
decrementing a number of hosts logged in to the target, wherein the host is not logged out of the target.

16. An apparatus, comprising:
means for receiving a port login directed to a target from a first host;
means for determining whether at least one other host is currently logged in to the target;
means for sending a port login to the target corresponding to whether at least one other host is currently logged in to the target, wherein the target is a virtual target;
wherein the means for determining whether at least one other host is currently logged in to the target includes determining whether at least one other host is currently logged in to one or more physical targets associated with the virtual target;
wherein the means for sending a port login to the target corresponding to whether at least one other host is currently logged in to the target includes sending a port login to the one or more physical targets corresponding to whether at least one other host is currently logged in to the one or more physical targets;
means for storing a login state associated with the target, the login state indicating a number of hosts logged in to the target; and
means for sending the login state to another network device, wherein sending the login state to another network device includes sending a data structure including the login state associated with the target to another network device;
wherein the data structure further identifies a maximum number of concurrent logins that the target can support or indicates whether the maximum number of concurrent logins that the target can support has been met.

17. An apparatus, comprising:
a processor; and
a memory, at least one of the processor or the memory being configured for:
receiving a port login directed to a target from a first host;
determining whether at least one other host is currently logged in to the target; and
sending a port login to the target corresponding to whether at least one other host is currently logged in to the target, wherein the target is a virtual target;
wherein determining whether at least one other host is currently logged in to the target includes determining whether at least one other host is currently logged in to one or more physical targets associated with the virtual target;
wherein sending a port login to the target corresponding to whether at least one other host is currently logged in to the target includes sending a port login to the one or more physical targets corresponding to whether at least one other host is currently logged in to the one or more physical targets;
storing a login state associated with the target, the login state indicating a number of hosts logged in to the target; and
sending the login state to another network device, wherein sending the login state to another network device includes sending a data structure including the login state associated with the target to another network device;
wherein the data structure further identifies each Logical Unit (LUN) associated with the target and a LUN capacity for each LUN associated with the target.

18. The apparatus as recited in claim 17, at least one of the processor or the memory being further configured for:
identifying each Logical Unit (LUN) associated with the virtual target; and
ensuring that each LUN associated with the virtual target is responding and has a capacity to read data from the one or more physical targets associated with the virtual target.

* * * * *